United States Patent
Crawford et al.

(10) Patent No.: US 7,625,487 B2
(45) Date of Patent: Dec. 1, 2009

(54) ADSORBENT BED AND WATER TREATMENT METHOD OF USE

(75) Inventors: Patricia A. Crawford, Bensalem, PA (US); Charles J. Hickey, Bensalem, PA (US); Garth R. Parker, Jr., Lansdale, PA (US); Jose Antonio Trejo, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 32 days.

(21) Appl. No.: 12/317,748

(22) Filed: Dec. 29, 2008

(65) Prior Publication Data

US 2009/0184054 A1 Jul. 23, 2009

Related U.S. Application Data

(60) Provisional application No. 61/011,663, filed on Jan. 18, 2008.

(51) Int. Cl.
*C02F 1/42* (2006.01)

(52) U.S. Cl. ..................... 210/284; 210/290; 210/684

(58) Field of Classification Search ................. 210/684, 210/284, 290
See application file for complete search history.

(56) References Cited

U.S. PATENT DOCUMENTS

| 6,849,187 | B2 | 2/2005 | Shaniuk | |
|---|---|---|---|---|
| 6,994,792 | B2 | 2/2006 | Schlegel | |
| 7,247,242 | B1 * | 7/2007 | Moore et al. | 210/662 |
| 2003/0209495 | A1 * | 11/2003 | Schlegel | 210/660 |
| 2004/0262225 | A1 * | 12/2004 | C. et al. | 210/638 |
| 2006/0186054 | A1 * | 8/2006 | Webb et al. | 210/688 |
| 2006/0237371 | A1 * | 10/2006 | Sylvester et al. | 210/684 |
| 2008/0011686 | A1 | 1/2008 | Banavalie et al. | |

FOREIGN PATENT DOCUMENTS

JP 01 127094 5/1989

* cited by examiner

*Primary Examiner*—Chester T Barry
(74) *Attorney, Agent, or Firm*—Kenneth Crimaldi

(57) ABSTRACT

An adsorptive bed having hydrous iron oxide and calcium carbonate materials. The adsorptive bed is useful in water treatment applications for removing metal contaminants, particularly for removing arsenic-containing ions.

10 Claims, No Drawings

ADSORBENT BED AND WATER TREATMENT METHOD OF USE

This application claims the benefit of priority under 35 U.S.C. §119(e) of U.S. Provisional Patent Application No. 61/011,663 filed on Jan. 18, 2008.

The present invention relates to an adsorbent bed useful for water treatment.

Groundwater contamination, and in particular, contamination by arsenic, is a problem faced throughout the world. Many methods for removing contaminants from water and other aqueous solutions have been developed. Common technologies include chemical coagulation/precipitation processes, membrane separation processes, and adsorptive processes. For example, U.S. Pat. No. 6,994,792 discloses adsorptive materials, including hydrous iron oxides. However, alternative adsorptive materials and adsorptive beds would be useful in water treatment.

The problem addressed by this invention is to provide an alternative adsorptive bed which would be useful in water treatment.

STATEMENT OF THE INVENTION

The present invention provides an adsorptive bed comprising hydrous iron oxide and calcium carbonate materials; said adsorptive bed having a first portion with an iron content of 35 to 50 wt % and a calcium content of 1 to 10 wt % and a second portion with an iron content of 0.5 to 5 wt % and a calcium content of 30 to 40 wt %.

DETAILED DESCRIPTION OF THE INVENTION

Percentages are weight percentages ("wt %"), temperatures are in ° C., unless specified otherwise, e.g., volume percent (vol %), and elemental percentages are on a dry basis. "Calcium carbonate materials" are those containing at least 50% calcium carbonate, alternatively at least 85% calcium carbonate, alternatively at least 90% calcium carbonate; in some embodiments, the maximum calcium carbonate content is 97%. Examples of materials containing calcium carbonate include, e.g., limestone, aragonite, vaterite, marble, dolomite and coral. These minerals often contain variable amounts of silica, clay, silt and sand; and they may be crystalline, clastic, granular or massive, depending on the method of formation. Crystals of calcite, quartz, dolomite or barite may line small cavities in the rock. In some embodiments of the invention, the calcium carbonate material is limestone powder having an average particle size from 10 to 100 microns, alternatively from 30 to 70 microns. In some embodiments, the material comprises limestone chips, preferably in a range from 100 microns to 10 mm, alternatively from 100 to 800 microns, alternatively from 150 microns to 500 microns.

The term "hydrous oxide" or "oxyhydroxide" refers to a mixture of iron compounds precipitated from water at high pH. Hydrous oxides may be oxides and/or hydroxides of iron. Their structure may be amorphous or crystalline. Examples of iron oxides useful in the present invention include, e.g., amorphous and crystalline forms including goethite, lepidocrocite, schwertmannite, akaganeite, feroxhyte, ferrihydrite, hematite, magnetite, maghemite, wustite, bernalite and green rusts. Typically, hydrous oxides of iron are formed by increasing the pH of an aqueous iron salt above 3, preferably from 5 to 7, by addition of aqueous base. In some embodiments of the invention, the adsorbent for the adsorbent bed of this invention is produced by combining particles of the calcium carbonate material with an iron compound, resulting in iron-coated particles. Particles of a material containing calcium carbonate can be coated with hydrous oxides by adding base to a reactor containing the particles and an aqueous solution of an iron salt, preferably iron (III) chloride, at a pH below 3. The average thickness of the coating is from 5 to 50 microns. The coverage of the material containing calcium carbonate can be complete or partial. In some embodiments of the invention, the surface area of the iron-coated particles is from 20 to 80 $m^2/g$, and the pore size is 20 to 50 Å, as measured by BET porosimetry. In some embodiments of the invention, excess water is drained from the coated particles, and they are dried to achieve a moisture content from 2 to 30%, alternatively from 2 to 15%. In some embodiments of the invention, the calcium carbonate material is contacted with a solution of a ferrous (iron(II)) salt, and then with an oxidizing agent to produce a precipitate of hydrous iron (III) oxides on the calcium carbonate material. Suitable oxidizing agents include, e.g., peroxides, permanganate and manganese dioxide.

Preferably, the iron content of the freshly prepared iron-coated particles, on a dry basis, is from 1% to 50%. In some embodiments of the invention, the iron content is at least 2%, alternatively at least 3%, alternatively at least 4%. In some embodiments, the iron content is no more than 25%, alternatively no more than 15%, alternatively no more than 10%, alternatively no more than 8%.

In some embodiments of the invention, the adsorptive bed is produced by packing the bed with iron-coated calcium carbonate material, and then expanding the bed via up-flow of water and allowing it to settle. The bed expansion may be repeated several times. Preferably, the bed is expanded from 1.5 to 3 times its original volume, alternatively from 1.5 to 2.5 times. The expansion produces a density gradient in the bed, with a denser portion at the bottom of the bed with a less dense portion above it. In some embodiments of the invention, the bed is produced by adding one material to the bed, followed by the other. In this method, the denser portion may be either at the bottom or top of the bed.

In some embodiments of the invention, the first portion comprises 30 to 95 vol % of the bed and the second portion comprises 5 to 70 vol % of the bed. Alternatively, the first portion comprises 30 to 70 vol % of the bed and the second portion comprises 30 to 70 vol % of the bed, alternatively the first portion comprises 35 to 65 vol % of the bed and the second portion comprises 35 to 65 vol % of the bed. In some embodiments of the invention, the particle size range of the first portion is from 30 to 200 microns and the particle size range of the second portion is from 125 to 2000 microns. Alternatively, the particle size range of the first portion is from 50 to 180 microns. Alternatively, the particle size range of the second portion is from 50 to 750 microns, alternatively from 100 to 450 microns. In some embodiments, the first portion has an iron content of at least 38 wt %, alternatively at least 40 wt %; the calcium content is at least 2 wt %, alternatively at least 3 wt %, alternatively at least 4 wt %; the iron content is no greater than 48 wt %, alternatively no greater than 46 wt %; and the calcium content is no greater than 9 wt %, alternatively no greater than 8 wt %, alternatively no greater than 7 wt %. In some embodiments, the second portion has an iron content of at least 0.8%, alternatively at least 1 wt %; the calcium content is at least 32 wt %, alternatively at least 34 wt %; the iron content is no greater than 3 wt %; the calcium content is no greater than 39 wt %, alternatively no greater than 38 wt %. In some embodiments, BET surface area of the first portion is from 150 to 300 $m^2/g$ and BET surface area of the second portion is from 1 to 10 $m^2/g$.

The present invention is further directed to a method for removing arsenic from water by contacting water containing arsenic with the adsorptive bed of the invention. The method removes contaminants from aqueous solutions, such as water, water-based liquids, and other liquids. The contaminants that may be removed include, but are not limited to: arsenic, nitrate, silica, perchlorate, phosphate, chloride, fluoride, copper, uranium, manganese, mercury, nickel, chromium, selenium, cadmium, iron, zinc, cobalt, lead, aluminum, barium, bismuth, antimony, chromate and cyanide. The method is particularly applicable to the removal of arsenic from water. In water, arsenic is present mainly in two oxidation states: arsenate, As(V), and arsenite, As(III). The arsenate structure at low pH in water is $H_3AsO_4$ and the arsenite structure is $H_3AsO_3$. Arsenate is most prevalent in oxygenated waters (surface waters). The concentration range of As in water generally is between parts per million ("ppm") and low parts per billion ("ppb"). Preferably, the first portion is above the second portion and the flow of water in the bed is downward.

Preferably, the flow rate in bed volumes ("BV") per minute through the bed is from 0.01 to 15, alternatively from 0.1 to 6, alternatively from 0.5 to 4.

EXAMPLES

Example 1

Process for Coating Limestone Particles—Dried Media 400 g of limestone particles of 212-710 micron size range were charged to a rotary reactor. 400 ml of deionized water were charged to the reactor. Gradually, 800 ml of ferric chloride solution (40% w/v) were added over 20 minutes. The mixture was allowed to stir for 35 minutes at room temperature. 1200 ml of NaOH 15% w/w were added in 3 minutes and the mixture stirred for 10 minutes. pH was maintained in the range 4-9 after 60 minutes. Water wash was done with 25 liters of water until the effluent was clear. The final pH was 7.2. The lot was drained and oven dried at 55° C./24 hours. The moisture content in the media was less than 10% by weight and packed.

A sample was taken from the lot, dried at 110° C./24 hours for characterization. Particle size measurement gave a bimodal particle size distribution of 50-180 microns and 212-710 microns. %-Fe was 9%-weight by acid digested media, acid digested and iron was measured by ICP. BET surface area of 45 $m^2$/g was reported.

Example 2

Process for Coating Limestone Particles—Wet-Media 400 g of limestone particles of 212-710 micron size range were charged to a rotary reactor. 400 ml of deionized water were charged to the reactor. Gradually, 800 ml of ferric chloride solution (40% w/v) were added over 20 minutes. The mixture was allowed to stir for 35 minutes at room temperature. 1200 ml of NaOH 15% w/w were added in 3 minutes and the mixture stirred for 10 minutes. pH was maintained in the range 4-9 after 60 minutes. Water wash was done with 25 liters of water until the effluent was clear. The final pH was 7.2. The lot was drained, dried on a Buchner funnel and packed. The moisture content of the media was higher than 20%.

A sample was taken from the lot, dried at 110° C./24 hours for characterization. The particle size measurement gave a bimodal particle size 50-180 microns and 212-710 microns. %-Fe was 9%-weight by acid digested media, acid digested and iron was measured by ICP. BET surface area of 45 $m^2$/g was reported.

Example 3

Process for Coating Limestone Particles—Dried Media 400 g of limestone particles of 212-355 micron size range were charged to a rotary reactor. 400 ml of deionized water were charged to the reactor. Gradually, 800 ml of ferric chloride solution (40% w/v) were added over 20 minutes. The mixture was allowed to stir for 35 minutes at room temperature. 1200 ml of NaOH 15% w/w were added in 3 minutes and the mixture stirred for 10 minutes. pH was maintained in the range 4-9 after 60 minutes. Water wash was done with 25 liters of water until the effluent was clear. The final pH was 7.2. The lot was drained and oven dried at 55° C./24 hours. The moisture content in the media was less than 10% by weight.

A sample was taken from the lot, dried at 110° C./24 hours for characterization. Particle size measurement gave a bimodal particle size distribution of 50-190 microns and 212-355 microns. %-Fe was 18%-weight by acid digested media, acid digested and iron was measured by ICP. BET surface area of 75 $m^2$/g was reported.

Example 4

Un-Classified Bed Preparation—Dried Media 8 ml of dried media from Example 1 was charged to a column (10 mm of internal diameter and 17 mL of total volume). The 17 mL column was filled with water through a pump by up flow at low flow rate of 1 mL/min to wet the media without significantly expanding the bed.

Example 5

Un-Classified Bed Preparation—Wet Media 8 ml of Buchner dried media from Example 2 was charged to a column (10 mm of internal diameter and 17 ml of total volume). The 17 ml column was filled with water through a pump by up flow at a low flow rate of 1 ml/min to wet the media without significantly expanding the bed.

Example 6

Classified Bed Preparation (Dried Sample)

8 ml of dried media from Example 1 was charged to a column (10 mm of internal diameter and 17 ml of total volume). The 17 ml column was filled with water through a pump by up flow at low flow rate of 2 ml/min to wet the media. The flow rate was increased to expand the bed to 16 ml and then the flow was stopped. The media were allowed to sediment and after 5 minutes the procedure was repeated. This last step was performed 7 times. Two layers were obtained. The %-volume of the bottom layer was 57% and the top layer was 43%. ICP analysis of the top layer showed that it was 43.5% iron and 6.5% calcium, while the bottom layer was 1% iron and 37.6% calcium, all on a dry basis.

Example 7

Classified Bed Preparation (Dried Sample)

8 ml of dried media from Example 3 was charged to a column (10 mm of internal diameter and 17 ml of total volume). The 17 ml column was filled with water through a pump by up flow at low flow rate of 2 ml/min to wet the media. The flow rate was increased to expand the bed to 16 ml and then the flow was stopped. The media were allowed to sediment and after 5 minutes the procedure was repeated. This last step was performed 7 times. Two layers were obtained. The %-volume of the bottom layer was 44% and the top layer was 56%. ICP analysis of the top layer showed that it was 45.2% iron and 5.5% calcium, while the bottom layer was 2% iron and 36.7% calcium, all on a dry basis.

Example 8

Breakthrough Curve for Arsenic

The columns containing 8 ml of media from Example 4-6 were then used for arsenic removal. An arsenic solution containing 100 ppb arsenic, pH 7.6, silica 20 ppm was prepared. The flow rate used was 5 ml/min in a down flow configuration. Samples were taken at different times and the number of bed volumes (BV) passed through the column at breakthrough was determined. Breakthrough was considered as occurring when the concentration of arsenic in the eluate reached 10 ppb (Drinking Water MCL Standard). The results are presented below:

| | |
|---|---|
| Example 4 | 2800 BV |
| Example 5 | 2850 BV |
| Example 6 | 7600 BV |
| Example 7 | 15000 BV |

Example 9

Simultaneous Removal of As(III) and Fe(II)

The column containing 8 ml of media from Example 6 were then used for arsenite and iron(II) removal An arsenite solution containing 100 ppb arsenite, pH 7.6, silica 20 ppm and Fe(II) 2 ppm was prepared. The flow rate used was 10 ml/min controlled by a pump in a down flow configuration. 21 Liters of solution were passed through the column and samples were taken after each liter. The Fe(II) in the effluent for all the samples was less than 0.2 ppm and As(III) was less than 10 ppb.

Example 10

Heavy Metal Removal

The column containing 8 ml of media from Example 6 were then used for heavy metals: Hg, Pb and Cd. Solutions were prepared using ICP standards to make 10 liters of 250 ppb Hg, 270 ppb Pb and 310 ppb and pH 4. The flow rate used was 5 ml/min controlled by a pump in a down flow configuration. 10 Liters of solution were passed through the column and samples were taken after each liter. The resulting concentration in the effluent samples were: Hg<0.1 ppb, Pb<0.2 ppb and Cd<0.1 ppb.

The invention claimed is:

1. An adsorptive bed comprising hydrous iron oxide and calcium carbonate materials; said absorptive bed having a first portion with an iron content of 35 to 50 wt % and a calcium content of 1 to 10 wt % and a second portion with an iron content of 0.5 to 5 wt % and a calcium content of 30 to 40 wt %.

2. The adsorptive bed of claim 1 in which the first portion comprises 30 to 95 vol % of the bed and the second portion comprises 5 to 70 vol % of the bed.

3. The adsorptive bed of claim 2 in which BET surface area of the first portion is from 150 to 300 $m^2/g$ and BET surface area of the second portion is from 1 to 10 $m^2/g$.

4. The adsorptive bed of claim 3 in which particle size range of the first portion is from 30 to 200 microns and particle size range of the second portion is from 125 to 2000 microns.

5. The adsorptive bed of claim 4 in which the first portion has an iron content of 40 to 48 wt % and a calcium content of 2 to 9 wt % and a second portion with an iron content of 1 to 3 wt % and a calcium content of 32 to 39 wt %.

6. The adsorptive bed of claim 5 in which the first portion is above the second portion.

7. A method for removing arsenic from water by contacting water containing arsenic with the adsorptive bed of claim 1.

8. The method of claim 7 in which the first portion comprises 30 to 95 vol % of the bed and the second portion comprises 5 to 70 vol % of the bed, BET surface area of the first portion is from 150 to 300 $m^2/g$ and BET surface area of the second portion is from 1 to 10 $m^2/g$, and particle size range of the first portion is from 50 to 200 microns and particle size range of the second portion is from 125 to 2000 microns.

9. The method of claim 8 in which the first portion comprises 30 to 70 vol % of the bed and the second portion comprises 30 to 70 vol % of the bed.

10. The method of claim 9 in which the first portion is above the second portion and the water flows downward.

\* \* \* \* \*